3,549,554
LASER PHOSPHATE GLASS COMPOSITIONS
Chikara Hirayama, Murrysville, and Nathan T. Melamed, Pittsburgh, Pa., assignors to Westinghouse Electric Corporation, Pittsburgh, Pa., a corporation of Pennsylvania
No Drawing. Continuation-in-part of application Ser. No. 514,658, Oct. 17, 1965. This application Oct. 8, 1968, Ser. No. 775,982
Int. Cl. C09k *1/36;* C03c *3/16, 3/28*
U.S. Cl. 252—301.6                                   7 Claims

ABSTRACT OF THE DISCLOSURE

This invention relates to phosphate glasses containing divalent manganese and having the general composition $(Mn_x, Me_{1-x})O \cdot yP_2O_5$ wherein $x$ has a value of from 0.05 to 1, and $y$ has a value of from $0.7X$ to 2, and Me represents an element from Group II-A and II-B of the Periodic Table with an atomic number not exceeding 56. By incorporating one or more trivalent rare earth ions such as neodymium, these glasses are fluorescent and are particularly useful as laser hosts. Alumina may be added up to 15 weight percent or up to 0.25 mol in the above formula, and/or $ZrO_2$ or $TiO_2$ up to 0.1 mols, the total of any two or all three not exceeding 0.25 mol. Silica may be substituted for a part of the $P_2O_5$ up to its limit of solid solubility, namely up to about 10% by weight.

PRIOR PATENT APPLICATION

This application is a continuation-in-part of our patent application Ser. No. 514,658, filed Oct. 17, 1965, and now abandoned.

BACKGROUND

Both crystals and glasses have been employed as hosts for various lasering ions. The general advantages of glass as a host material for lasers are generally known to those skilled in the art. One important advantage of glass over crystals, for example, is the relative ease of fabricating from glass bodies high optical quality structures of various sizes and shapes. The high energy output of glass host lasers, because of the possibility of high concentration of fluorescent ions without appreciable quenching, is another attractive advantage for glass.

It is an object of this invention to provide glass host lasers of improved properties.

It is a further object of this invention to provide glass hosts for lasers which will lase at relatively low threshold energy levels.

A further object is to provide laser glasses containing divalent manganese which are useful as laser hosts for rare earths.

It is another object to provide laser glasses which are clear, transparent and of good optical quality for absorption and emission properties.

These and other objects are apparent from and are accomplished in accordance with the following disclosure.

GENERAL DESCRIPTION OF THE INVENTION

In accordance with our invention, a laser host is prepared comprising a phosphate glass containing divalent manganese and having the nominal composition $(Mn_x, Me_{1-x})O \cdot yP_2O_5$ wherein $x$ is any value from 0.05 to 1, $y$ is any value from $0.7X$ to 2 and Me is at least one divalent metallic ion from Group II-A and II-B of the Periodic Table of Elements, with an atomic number not exceeding 56, preferably an ion having a radius not larger than 1.0 angstrom, such for example as magnesium, calcium or zinc or mixtures of two or more, but including strontium and barium. Basically, these glasses are manganese phosphate glasses. Excellent results were had with magnesium manganese phosphate glasses. It has been discovered that glasses of the foregoing general composition are fluorescent glasses which are useful as laser hosts, by incorporating one or more of the trivalent rare earth ions such as neodymium, europium, terbium, erbium, samarium and ytterbium up to 10% by weight thereof. Glasses covering the range of composition from $x=0.05$ to $x=1$ have been prepared and evaluated. Up to 15% by weight of alumina 0.1 mol of $ZrO_2$ and/or $TiO_2$, up to a total of 0.25 mol in the formula of any two or all three oxides, may be present in the glasses. Silica may be substituted for a small part of the $P_2O_5$, about 10% maximum. They are visually perfectly clear and transparent, good quality glasses with certain desirable absorption and emission properties which are useful for laser uses.

Neodymium ($Nd^{+3}$) is an ion capable of stimulated emission at room temperature and it is the preferred rare earth ion in the laser glasses of this invention. However, other rare earth activators or dopants which are excited by light having a wavelength longer than about 3000 angstroms may be substituted for the neodymium ion. Examples of other suitable activator ions include trivalent ions of ytterbium, europium, terbium, samarium and erbium. Of the rare earth ions which fluoresce at room temperature neodymium has the highest quantum efficiency. The rare earth ions can be in concentrations of from about 0.5% to 10% of the weight of the glasses.

Very efficient energy transfer takes place from the manganese to the rare earth ion, making the glass valuable as a laser material, with the manganese functioning to sensitize and improve the rare earth fluorescence. The fluorescence may be enhanced by adding certain other cosensitizers such as arsenic, antimony, cerium, lead, bismuth and tin in amounts of from about 0.5 to 5% by weight.

A desirable characteristic of the glasses which constitute this invention is that they continue to fluoresce even up to the highest concentration of manganese where $x=1$ and $y=0.7X$. At this high concentration of manganese, the absorption coefficient increases.

The glass host compositions of this invention are produced by conventional methods of melting optical glasses, namely at 1150–1500° C., with precautions to exclude iron and other elements which are known to seriously quench the fluorescence of the activated ion. In order to more fully describe the present invention and to provide preferred embodiments thereof, certain specific examples are set forth hereinbelow. It will be apparent from these descriptions that various modifications in materials and relative proportions may be made without departing from the invention as herein described.

EXAMPLE I

A batch of glass was melted from the following reagents:

| Reagents— | Parts by weight |
|---|---|
| $Mn(OAc)_2 \cdot 4H_2O$ | 4760 |
| $3MgCO_3 \cdot Mg(OH)_2 \cdot 3H_2O$ | 1640 |
| $NH_4H_2PO_4$ | 8944 |
| $Nd_2O_3$ | 320 |
| $As_2O_3$ | 80 |

The dry ingredients were thoroughly blended, then melted in a silica crucible at 1200°–1450° C., preferably about 1350° C. During melting, the mixture was stirred occasionally with a silica stirring rod over a period of 22 hours. After fining, the glass was poured into a slab mold and annealed at 475° C. and then cooled slowly to room temperature.

Other glasses are prepared by substituting for the $Nd_2O_3$, other rare earth oxides such as europium oxide ($Eu_2O_3$), terbium oxide ($Tb_2O_3$), erbium oxide ($Er_2O_3$), samarium oxide ($Sm_2O_3$), and ytterbium oxide ($Yb_2O_3$). In lieu of the arsenic oxide, antimony oxide ($Sb_2O_3$) also is used. In each case, a satisfactory glass slab is obtained. Good results were obtained when europium, terbium, erbium, samarium and ytterbium oxides are substituted for a part of the neodymium oxide—for instance 50% by weight.

EXAMPLE II

Suitable laser glasses were produced by smelting the following mixtures according to the general procedure of Example I:

(A)

| Reagents— | Parts by weight |
|---|---|
| $MgCO_3$ | 63 |
| $NH_4H_2PO_4$ | 175 |
| $Nd_2O_3$ | 4 |

(B)

| | |
|---|---|
| $MgCO_3$ | 38 |
| $MnO_2$ | 18 |
| $NH_4H_2PO_4$ | 175 |
| $Nd_2O_3$ | 2, 4, 6 and 9.5 |

(C)

| | |
|---|---|
| $MgCO_3$ | 54 |
| $MnO_2$ | 9.6 |
| $NH_4H_2PO_4$ | 175 |
| $Nd_2O_3$ | 4 |

(D)

| | |
|---|---|
| $MgCO_3$ | 18 |
| $MnO_2$ | 30 |
| $NH_4H_2PO_4$ | 175 |
| $Nd_2O_3$ | 4 |

(E)

| | |
|---|---|
| $Mn(OAc)_2 \cdot 4H_2O$ | 115.4 |
| $NH_4H_2PO_4$ | 108.0 |
| $Nd_2O_3$ | 4 |

It should be noted that four different batches of composition (B) were prepared, one each with the respective neodymium proportions. In each instance in all the compositions the weight given in parts for the $Nd_2O_3$ equals the same numerical percentage of neodymium oxide in the glass and, within a small error, the percentage of neodymium ion in the glass.

Highly satisfactory host glasses had compositions of the formula $$(Mn_xMg_{1-x})O \cdot yP_2O_5 \cdot ZNd_2O_3$$

wherein $x$ varied from 0.05 to 1 and where Z ranged up to 10% by weight. The glass composition from the mixture A was $MgO \cdot P_2O_5$ and it was not satisfactory for the practice of this invention. The glass composition from mixture (E) was $MnO \cdot P_2O_5$. Composition (D) appears to be about optimum for laser purposes.

Examples of other phosphate glasses in accordance with the invention and showing laser properties are the following:

EXAMPLE III (F) $(Mn_{0.5} \cdot Sr_{0.5})O \cdot P_2O_5 \cdot 1.37$ wt. percent $Nd_2O_3$.
(G) $(Mn_{0.5} \cdot Ba_{0.5})O \cdot P_2O_5 \cdot 1.14$ wt. percent $Nd_2O_3$.
(H) $(Ba_{0.5} \cdot Mn_{0.5})O \cdot 2P_2O_5 \cdot 4$ wt. percent $Nd_2O_3$.
(I) $(Mn_{0.5} \cdot Ba_{0.5})O \cdot P_2O_5 \cdot 4$ wt. percent $Nd_2O_3$.
(J) $(Mn_{.75} \cdot Mg_{.25})O \cdot 2P_2O_5$.

prepared with 1%, 2% and 6% $Nd_2O_3$.

These compositions were fused at 1300° C. Rods thereof are good lasers.

(K) $(Mn_{.8} \cdot Mg_{.2})O \cdot 2P_2O_5$.

prepared with 1%, 2% and 6% $Nd_2O_3$.

Rods of these glasses exhibit good laser action.

Tests of the contribution of the divalent manganese to the laser action of the glass were made. Using a laser rod of $(Mn_{0.5} \cdot Mg_{0.5})O \cdot P_2O_5 \cdot 4\%$ $Nd_2O_3$, when an optical flash pumping apparatus was employed to pump the $Nd^{3+}$ alone, all radiation which would otherwise pump the $Mn^{2+}$ being filtered out, a level of laser slope efficiency of 0.083% was obtained. When both the $Mn^{2+}$ and the $Nd^{3+}$ were pumped concurrently by the same flash pumping apparatus a 30% increase in slope efficiency was obtained, namely a 0.102% slope efficiency.

For testing, cylindrical rods of glasses of the foregoing compositions with neodymium present were prepared by cutting rods ⅜ x ⅜ x 3 inch from the center of the resulting glass slab. These rods were reannealed at 525° C. for approximately 6 hours, then cylindrical rods having diameters of ¼ inch with polished (less than 0.1λ) parallel faces (less than 5 seconds from parallelism) were constructed from these rods and assembled in laser cavities. All the glass compositions (B), (C), (D) and (E) were highly laser materials.

The glasses having the basic formula $$[Mn_xMg_{(1-x)}]O \cdot yP_2O_5$$

where $y$ has a value of between 0.5 and 2, may be modified to render them less water soluble, with a higher melting point and higher viscosity when molten, by adding $Al_2O_3$ up to 0.25 mol and $ZrO_2$ or $TiO_2$ in amounts of up to 0.1 mol, or any two or all three up to a total of 0.25 mol. Silica may be substituted for a part of the $P_2O_5$ component of the glass up to the limits of mutual solubility, for example in amounts of up to about 10 weight percent of the $P_2O_5$. The magnesium oxide component of the glass may be replaced in part, or entirely, by one or more of beryllium oxide, zinc oxide, calcium oxide, barium oxide, cadmium oxide and strontium oxide. For example, the glasses may comprise equal parts by weight of magnesium and strontium, or magnesium and cadmium or magnesium and beryllium oxide. Thus 12% of alumina added to composition (B) with 4% $Nd_2O_3$ being present, produced an excellent laser rod, its laser performance was substantially identical to the same rod without alumina.

Glasses of composition (B) have been prepared with equal molar parts of $MgCO_3$ and $CaCO_3$, namely 19 parts by weight of $MgCO_3$ and 23 parts by weight of $CaCO_3$ substituted for the 38 parts of $MgCO_3$, and the resulting glass exhibited excellent laser characteristics. Similarly zinc carbonates can be substituted for a part or all of the manganese carbonate in either composition (B) or the calcium modified composition (B).

Cerium oxide in an amount of 4% by weight was added to the composition (B) with an excellent laser glass being produced. Similarly lead, arsenic, antimony, bismuth and tin can be added to this composition, either individually or jointly, to replace all or a part of the cerium.

We claim:
1. A laser glass of the composition

$$(Mn_x, Me_{1-x})O \cdot yP_2O_5$$

wherein $x$ is a positive number from 0.05 to 1, inclusive, $y$ is a positive number from 0.7× to 2, inclusive, and Me is at least one divalent metal ion selected from Group II–A and II–B of the Periodic Table and having an atomic number not exceeding 56, said glass containing about 0.5 to 10% by weight of a trivalent rare earth ion selected from the group consisting of neodymium, europium, terbium, erbium, samarium and ytterbium.

2. A laser glass as defined by claim 1 further containing 0.5 to 5% by weight of a cosensitizer metal oxide of at least one element from the group consisting of arsenic, antimony, cerium, lead, bismuth and tin.

3. The laser glass of claim 1 wherein up to 15% by weight of alumina is present.

4. A laser glass consisting essentially of from 0.5 to 10% by weight of neodymium and the balance being of a composition $(Mn_x, Mg_{(1-x)})O \cdot yP_2O_5$ wherein $x$ is from about 0.5 to 0.75, and $y$ is from about 1 to 2.

5. The laser glass of claim 4, wherein up to .25 mol of alumina is present.

6. The laser glass of claim 4 where silica is substituted for part of the $P_2O_2$ in an amount of up to the mutual solubility of silica in $P_2O_5$, and not exceeding about 10% of the weight of the $P_2O_5$.

7. The laser glass of claim 4, wherein alumina and up to 0.1 mol of at least one oxide selected from the group consisting of $ZrO_2$ and $TiO_2$ is present, the total of alumina, $ZrO_2$ and $TiO_2$ not exceeding 0.25 mol.

References Cited

UNITED STATES PATENTS

| | | | |
|---|---|---|---|
| 2,270,124 | 1/1942 | Huniger et al. | 252—301.4X |
| 2,835,636 | 5/1958 | Rimbach | 252—301.4 |
| 3,113,033 | 12/1963 | Hoxie et al. | 106—47 |

OTHER REFERENCES

Shionoya et al.: "Applied Physics Letters," vol. 6, No. 6, Mar. 15, 1965, p. 117–18.

TOBIAS E. LEVOW, Primary Examiner

J. COOPER, Assistant Examiner

U.S. Cl. X.R.

252—301.4; 106—47, 52, 53